US010139563B2

United States Patent
Baudot et al.

(10) Patent No.: US 10,139,563 B2
(45) Date of Patent: Nov. 27, 2018

(54) METHOD FOR MAKING PHOTONIC CHIP WITH MULTI-THICKNESS ELECTRO-OPTIC DEVICES AND RELATED DEVICES

(71) Applicants: STMICROELECTRONICS SA, Montrouge (FR); STMICROELECTRONICS (CROLLES 2) SAS, Crolles (FR)

(72) Inventors: Charles Baudot, Lumbin (FR); Alain Chantre, Seyssins (FR); Sébastien Cremer, Sassenage (FR)

(73) Assignees: STMICROELECTRONICS SA, Montrouge (FR); STMICROELECTRONICS (CROLLES 2) SAS, Crolles (FR)

( * ) Notice: Subject to any disclaimer, the term of this patent is extended or adjusted under 35 U.S.C. 154(b) by 122 days.

(21) Appl. No.: 14/984,563

(22) Filed: Dec. 30, 2015

(65) Prior Publication Data
US 2017/0192170 A1    Jul. 6, 2017

(51) Int. Cl.
*G02B 6/34*    (2006.01)
*G02B 6/122*    (2006.01)
*G02B 6/136*    (2006.01)
*G02B 6/132*    (2006.01)
(Continued)

(52) U.S. Cl.
CPC .............. *G02B 6/122* (2013.01); *G02B 6/132* (2013.01); *G02B 6/136* (2013.01); *G02B 6/34* (2013.01); *G02B 6/4201* (2013.01); *G02B 2006/12147* (2013.01)

(58) Field of Classification Search
CPC ................................................... H01L 27/0738
See application file for complete search history.

(56) References Cited

U.S. PATENT DOCUMENTS 6,797,987 B2   9/2004   Chen
8,110,823 B2   2/2012   Bowers
8,890,286 B2   11/2014  O'Donnell et al.
(Continued)

FOREIGN PATENT DOCUMENTS

WO   2010025222 A1   3/2010

OTHER PUBLICATIONS

Fedeli et al., "Integration Issues of a Photonic Layer on Top of a CMOS Circuit," Proc. of SPIE, vol. 6125, 2006, pp. 61250H-1 to 61250H-15.
(Continued)

*Primary Examiner* — Sung Park
*Assistant Examiner* — Hoang Tran
(74) *Attorney, Agent, or Firm* — Seed IP Law Group LLP

(57) ABSTRACT

A method is for making a photonic chip including EO devices having multiple thicknesses. The method may include forming a first semiconductor layer over a semiconductor film, forming a second semiconductor layer over the first semiconductor layer, and forming a mask layer over the second semiconductor layer. The method may include performing a first selective etching of the mask layer to provide initial alignment trenches, performing a second etching, aligned with some of the initial alignment trenches and using the first semiconductor layer as an etch stop, to provide multi-level trenches, and filling the multi-level trenches to make the EO devices having multiple thicknesses.

21 Claims, 14 Drawing Sheets

(51) Int. Cl.
*G02B 6/42* (2006.01)
*G02B 6/12* (2006.01)

(56) References Cited

U.S. PATENT DOCUMENTS

| | | |
|---|---|---|
| 8,937,296 B2 | 1/2015 | Bowers |
| 9,097,848 B2 | 8/2015 | Bowers |
| 2003/0015768 A1 | 1/2003 | Bosco et al. |
| 2003/0164503 A1 | 9/2003 | Chen |
| 2007/0013020 A1 | 1/2007 | Blauvelt et al. |
| 2007/0014325 A1 | 1/2007 | Park et al. |
| 2007/0063314 A1* | 3/2007 | Chevalier ............ H01L 29/0649 257/565 |
| 2007/0170417 A1 | 7/2007 | Bowers |
| 2009/0245298 A1 | 10/2009 | Sysak et al. |
| 2010/0092144 A1 | 4/2010 | Blauvelt et al. |
| 2012/0038024 A1* | 2/2012 | Botula .............. H01L 21/76289 257/510 |
| 2013/0022072 A1 | 1/2013 | Bowers |
| 2014/0376857 A1* | 12/2014 | Chantre ............. G02B 6/12002 385/14 |
| 2015/0055911 A1 | 2/2015 | Bowers |
| 2016/0300972 A1* | 10/2016 | Vincent ................ G02B 6/1228 |

OTHER PUBLICATIONS

Liang et al., "100 mm Integration of III-V and Silicon-on-Insulator Wafers for the Realization of Distributed Feedback Silicon Evanescent Lasers," Proc. of SPIE, vol. 7135, 2008, pp. 71351O-1 to 71351O-7.

Fedeli et al., "Silicon Photonics Development in Europe," Proc. of SPIE, vol. 7220, 2009, pp. 72200A-1-72200A-12.

* cited by examiner

METHOD FOR MAKING PHOTONIC CHIP WITH MULTI-THICKNESS ELECTRO-OPTIC DEVICES AND RELATED DEVICES

TECHNICAL FIELD

The present disclosure relates to the field of electro-optic devices, and, more particularly, to a method for making the electro-optic devices and devices.

BACKGROUND

Currently, photonic integrated circuits (i.e. photonic chips) allow for the integration of active and/or passive optical devices, such as, for example, coupling structures, waveguides, modulators, or photodetectors. Another optical component is a hybrid III-V/Si laser source. Such a laser source includes an amplifying medium (gain medium) that includes a composite III-V semiconductor material, a waveguide situated in an underlying silicon layer and optically coupled to the gain medium, and a cavity resonator optically coupled to the waveguide and containing Bragg mirrors, for example. The gain medium emits light when it is excited by electrical energy (pumping), and the cavity resonator is intended, in cooperation with the gain medium, to amplify this light so as to deliver the laser beam.

Depending on the type of laser (Distributed Bragg Reflector (DBR) or Distributed Feedback laser (DFB)), the Bragg mirrors are situated in the silicon at the periphery of the gain medium or else under the gain medium. Such a hybrid laser source may require a very short distance, typically not more than a hundred nanometers, between the gain medium and the underlying silicon waveguide. Moreover, direct bonding of the gain medium to a waveguide of silicon-on-insulator type typically requires a planar surface prepared by a chemical-mechanical polishing step. Currently, a hybrid III-V laser source on a silicon substrate can be manufactured on an experimental basis and in isolation.

Integrated photonic circuits generally do not incorporate hybrid III-V/Si laser sources due to the difficulty of integrating these sources. This is because direct bonding to the silicon-on-insulator (SOI) film cannot be carried out after the complete production of the integrated circuit, and particularly after the production of the metallization levels of the interconnect part of the integrated circuit, i.e. the Back End Of Line (BEOL) part.

SUMMARY

Generally speaking, a method is for making a photonic chip including a plurality of electro-optic (BO) devices having multiple thicknesses. The method may comprise forming a first semiconductor layer over a semiconductor film, forming a second semiconductor layer over the first semiconductor layer, and forming at least one mask layer over the second semiconductor layer. The method may include performing a first selective etching of the at least one mask layer to provide initial alignment trenches, performing at least one second etching, aligned with at least some of the initial alignment trenches and using the first semiconductor layer as an etch stop, to provide multi-level trenches, and filling the multi-level trenches to make the plurality of EO devices having multiple thicknesses. Advantageously, the method may provide the photonic chip with a broader range of devices.

Additionally, the performing of the at least one second etching may comprise a partial etching of the second semiconductor layer, and a subsequent complete selective etching of the second semiconductor layer. The method may further comprise performing at least one selective third etching of the first semiconductor layer and the semiconductor film. The at least one selective third etching may comprise a partial etching of the first semiconductor layer and the semiconductor film.

The at least one third selective etching may comprise an etching of a first section of the semiconductor film to a first depth, and an etching of a second section of the semiconductor film different than the first section and to a second depth different than the first depth.

For example, the first semiconductor layer may comprise silicon germanium, and the second semiconductor layer may comprise silicon. The first selective etching may be to a uniform depth. The method may also include at least one planarization step. The filling of the multi-level trenches may comprise filling the multi-level trenches with at least one dielectric material. The plurality of EO devices may have multiple thicknesses comprises an optical waveguide and an optical grating coupler.

Another aspect is directed to a photonic chip. The photonic chip may include a semiconductor film, a first semiconductor layer above the semiconductor film, and a second semiconductor layer above the first semiconductor layer and having at least one first trench extending partially toward the first semiconductor layer and at least one second trench extending to the first semiconductor layer. The photonic chip may comprise dielectric material within the at least one first trench and within the at least one second trench to define first and second respective EO devices having multiple thicknesses.

DETAILED DESCRIPTION

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout.

Figure 27:
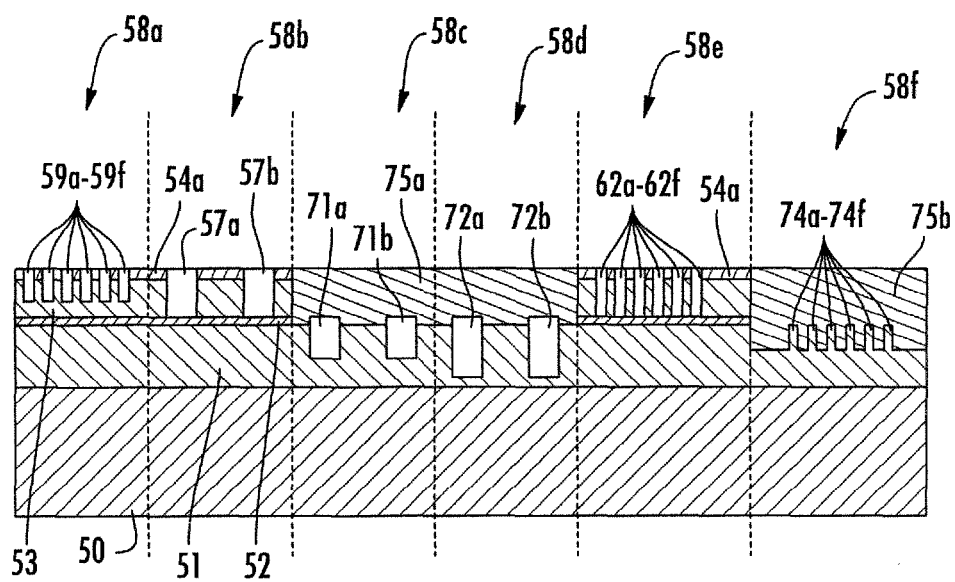
Figure 28:
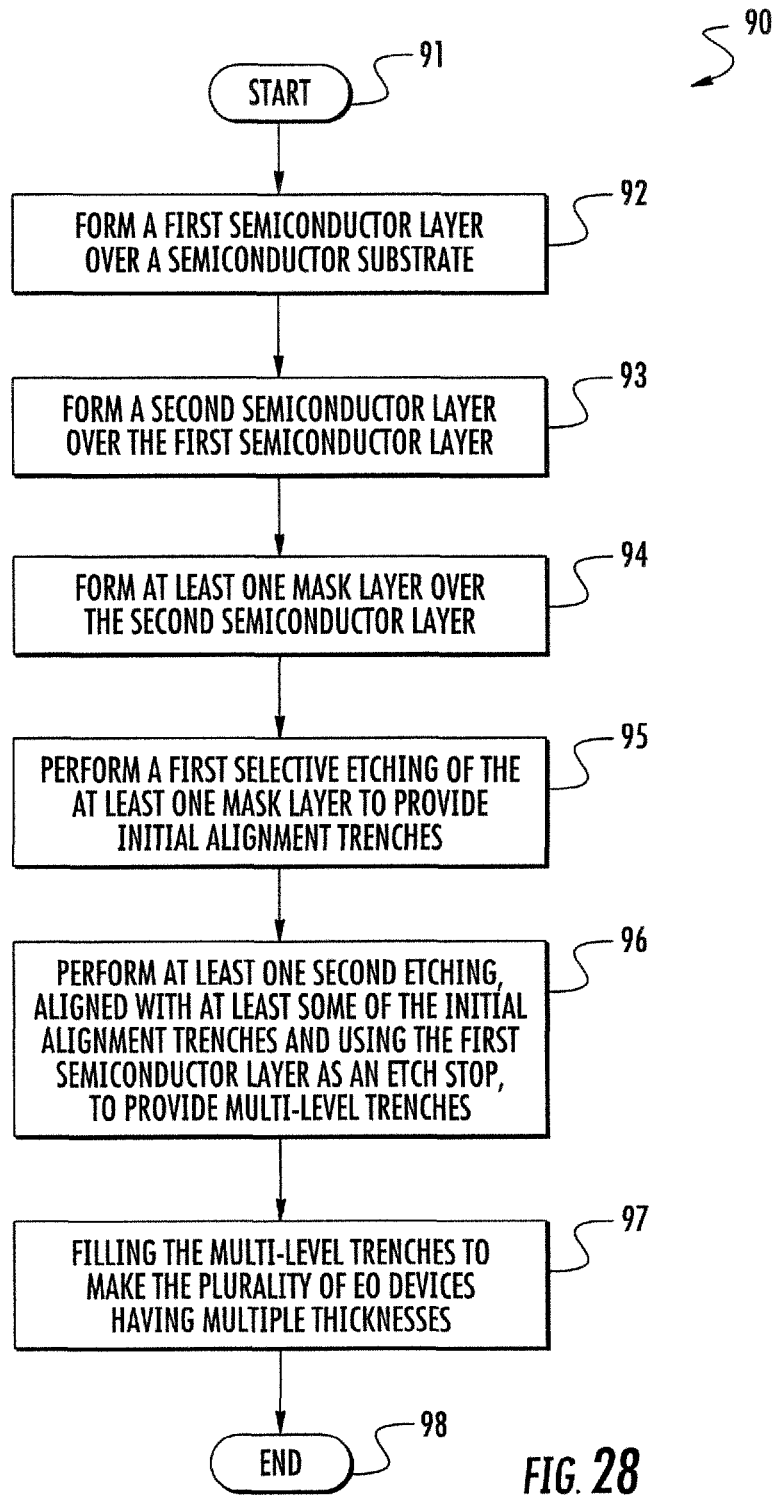
FIG. 28 is a flowchart of steps in another embodiment of the method for making a photonic chip including a plurality of EO devices, according to the present disclosure.

Referring initially to FIGS. 27 and 28, a method for making a photonic chip 80 and the photonic chip are now described (flowchart 90). The photonic chip 80 illustratively includes a semiconductor film 51 (e.g. 310 nm silicon). In the illustrated embodiment, the photonic chip 80 comprises an insulator layer 50 (e.g. 720 nm buried oxide) under the semiconductor film 51, for example, provided via an SOI wafer. In view of easing illustration, a semiconductor substrate of the SOI wafer, under the insulator layer 50, is not depicted. The photonic chip 80 illustratively includes a first semiconductor layer 52 above the semiconductor film 51, and a second semiconductor layer 53 above the first semiconductor layer and having a plurality of first trenches 59a-59f, 57a-57b, 62a-62f extending partially toward the first semiconductor layer and a plurality of second trenches 71a-71b, 72a-72b extending to the first semiconductor layer. The photonic chip 80 illustratively includes dielectric material 75a-75b within the plurality of first trenches 59a-59f, 57a-57b, 62a-62f and within the plurality of second trenches 71a-71b, 72a-72b to define first and second respective EO devices 58a-58f having multiple thicknesses.

In the illustrative embodiment, the first EO device 58a comprises a 500 nm laser DFB/DFR. The second EO device 58b comprises a 500 nm laser integrated waveguide. The third EO device 58c comprises a standard 300 nm SOI rib waveguide. The fourth EO device 58d comprises an advanced deep-rib waveguide. The fifth EO device 58e comprises an advanced thick grating coupler. The sixth EO device 58f comprises an optimized 300 nm SOI grating coupler. Advantageously, the plurality of EO devices 58a-58f may have multiple thicknesses integrated on a single photonic chip 80.

The illustrated EO devices 58a-58f are exemplary, and it should be appreciated that other EO device types could be integrated on the photonic chip 80, such as other sizes of rib waveguides, a strip waveguide, a rib waveguide with a linear modulator, EO ring devices, and multiplexing/demultiplexing EO devices. It should also be appreciated that varying depths and orientations of the EO devices 58a-58f are within the scope of the present disclosure, and that the illustrated embodiment is exemplary in nature.

Figure 1:
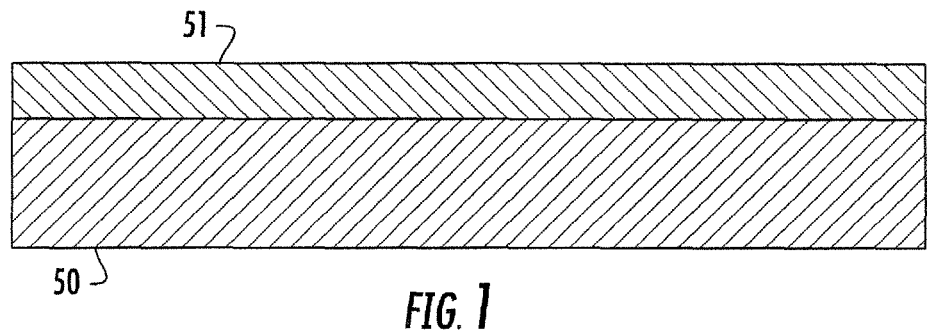
FIGS. 1-27 are schematic cross-sectional diagrams of steps in a method for making a photonic chip including a plurality of EO devices, according to the present disclosure.
Figure 2:
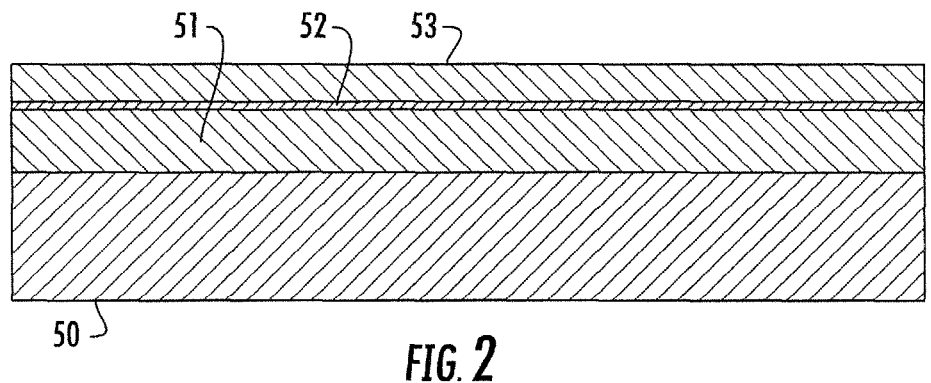
Figure 3:
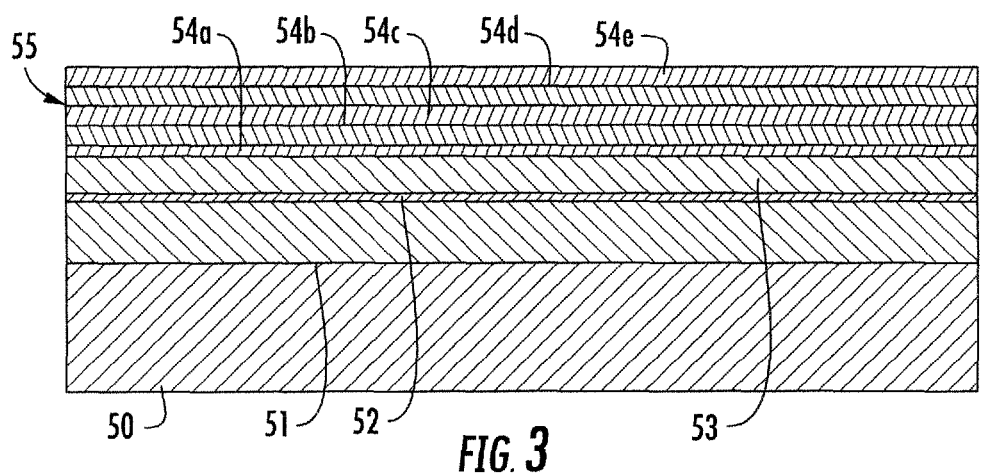

Referring now to FIGS. 1-3, the method illustratively includes forming a first semiconductor layer 52 (e.g. silicon germanium, 10-20 nm, epitaxially grown) over a semiconductor film 51 (e.g. 310 nm silicon). In the illustrated embodiment, the semiconductor film 51 is provided by a SOI wafer, and includes an underlying insulator layer 50 (e.g. 720 nm buried oxide) over a semiconductor substrate (not shown). The method illustratively includes forming a second semiconductor layer 53 (e.g. silicon, >200 nm) over the first semiconductor layer 52, and forming a plurality of mask layers 55 over the second semiconductor layer 53. (Blocks 92-93) The second semiconductor layer 53 provides the needed thickness for the integrated laser EO device 58a to be formed. The plurality of mask layers 55 (e.g. hard mask layers) illustratively includes hard mask layers of silicon dioxide 54a, 54c, 54e, and silicon nitride 54b, 54d. (Block 94) Of course, in other embodiments, the plurality of mask layers 55 may comprise other materials suitable for the disclosed method's purposes.

Figure 4:
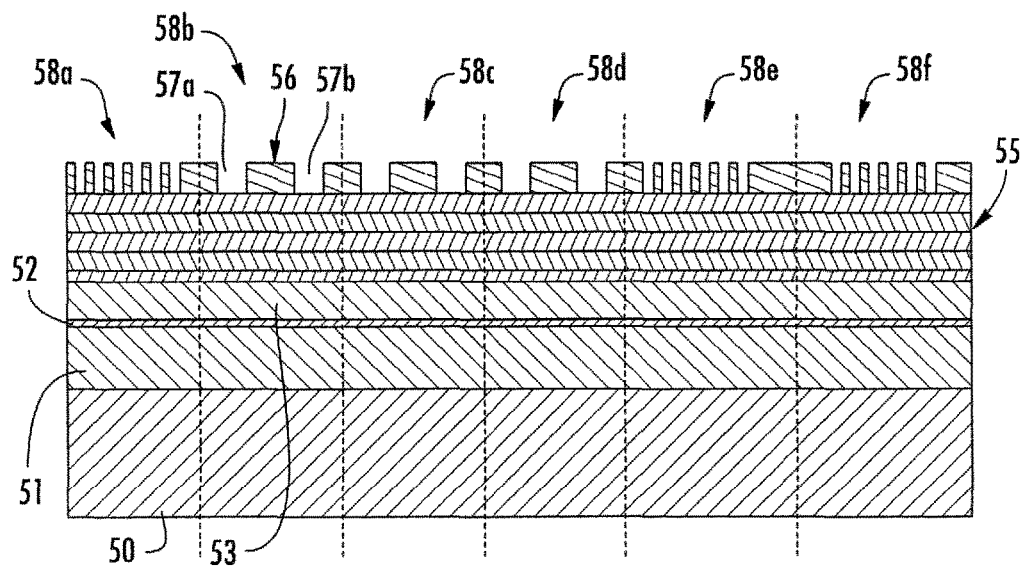
Figure 5:
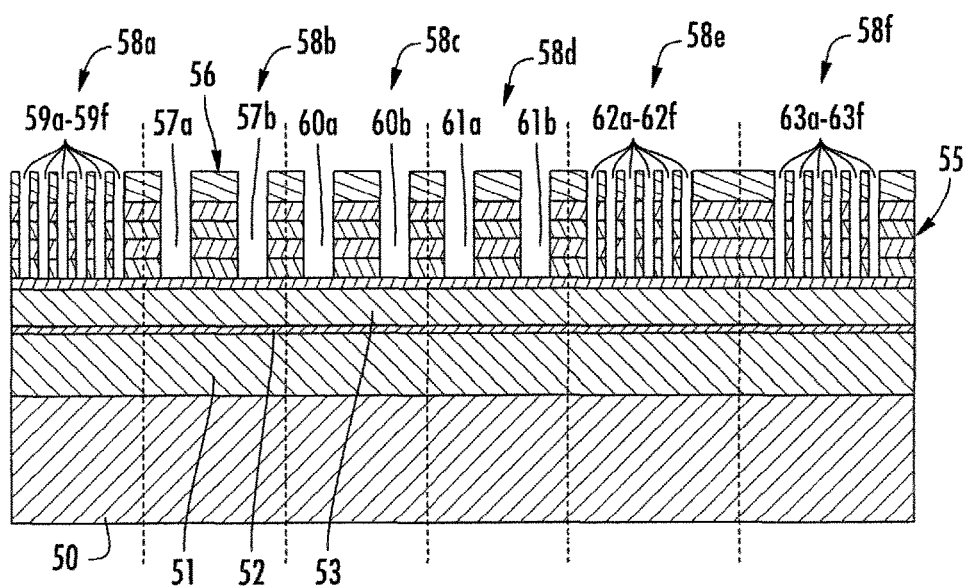

Referring now to FIGS. 4-5, the method illustratively includes forming a first photoresist layer 56 (e.g. 80 nm) over the plurality of mask layers 55. The first photolithography illustratively defines the pattern of all EO devices 58a-58f (delineated by the vertical dashed lines), and provides auto-alignment of the plurality of EO devices. The method illustratively includes performing a first selective etching of the plurality of mask layers 55 to provide initial alignment trenches 59a-59f, 57a-57b, 60a-60b, 61a-61b, 62a-62f, 63a-63f for the plurality of EO devices 58a-58f. (Block 95) The first selective etching is performed illustratively to a uniform depth across the semiconductor film 51. In relationship with the present process step (FIG. 5), it could be said that depth of the trenches 59a-59f, 57a-57b, 60a-60b, 61a-61b, 62a-62f, 63a-63f is well controlled by performing the etch of each layer of the hard mask stack 55 in a selective manner, or at least by etching the penultimate hard mask layer selectively with respect to the last layer.

Figure 6:
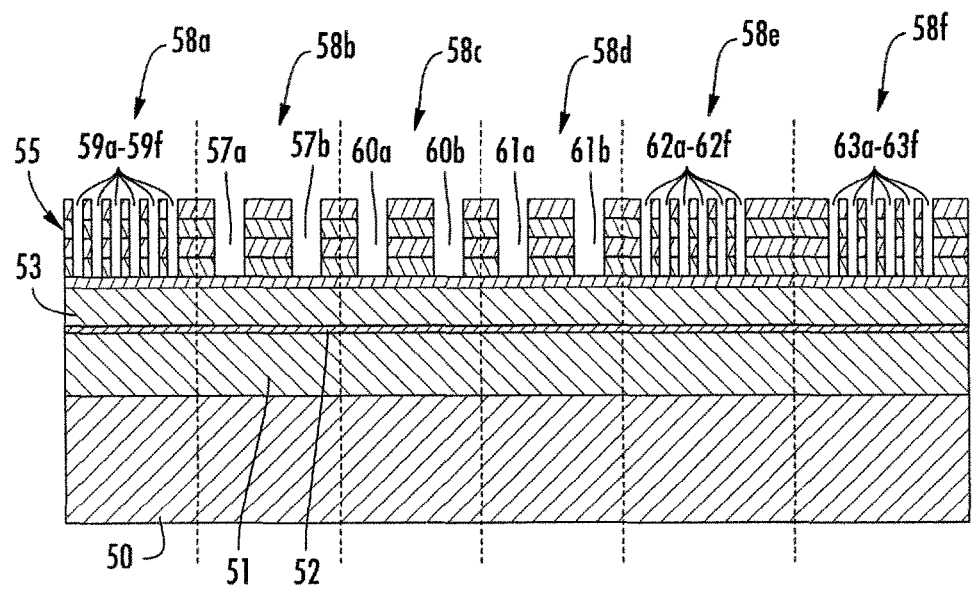
Figure 7:
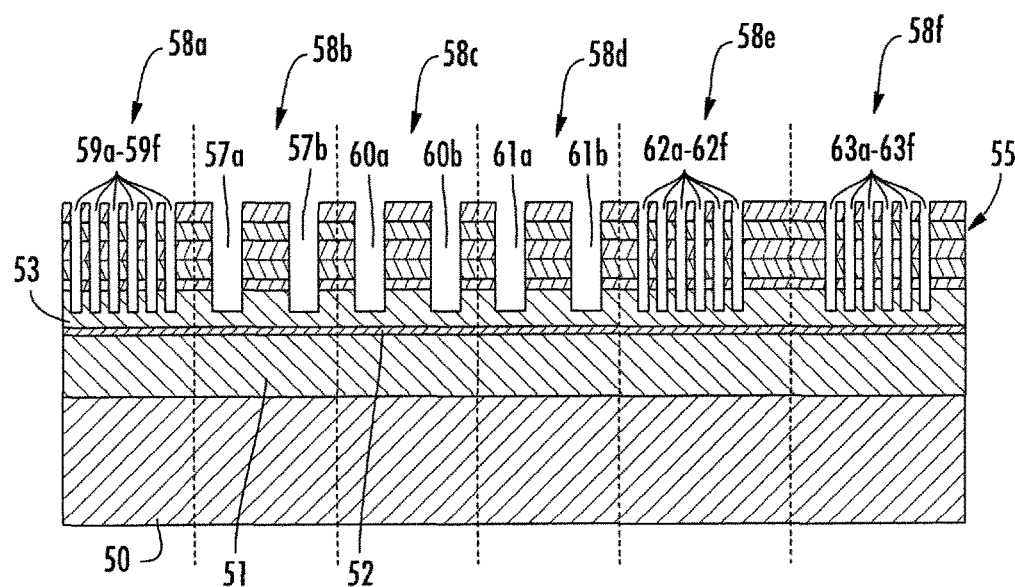

Referring now to FIGS. 6-7, the method illustratively includes removing the first photoresist layer 56. The method illustratively includes performing a semiconductor partial etch of the initial alignment trenches 59a-59f, 57a-57b, 60a-60b, 61a-61b, 62a-62f, 63a-63f for the plurality of EO devices 58a-58f, now extending into the second semiconductor layer 53. This etching step defines the mirror for the laser cavity of the first EO device 58a.

Figure 8:
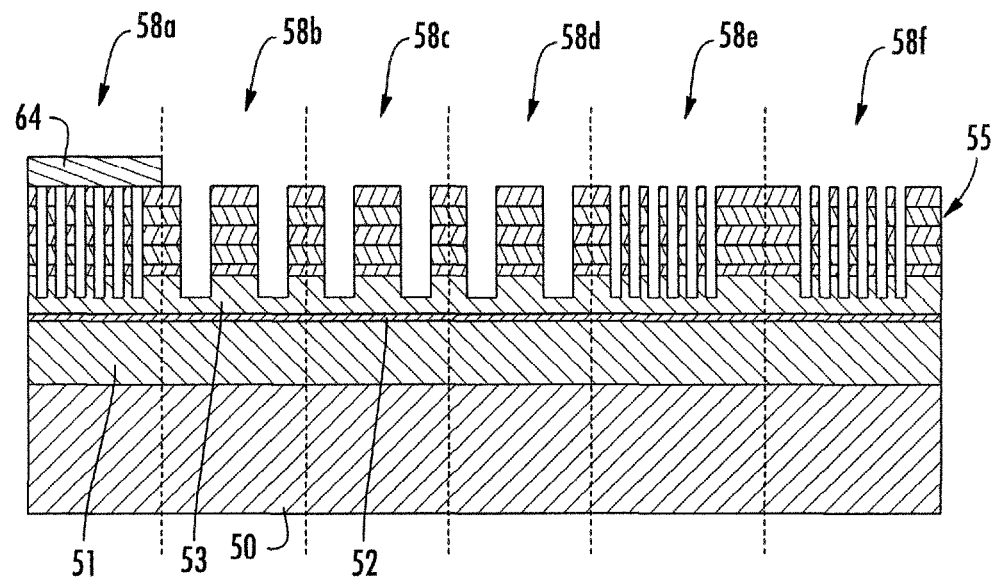
Figure 9:
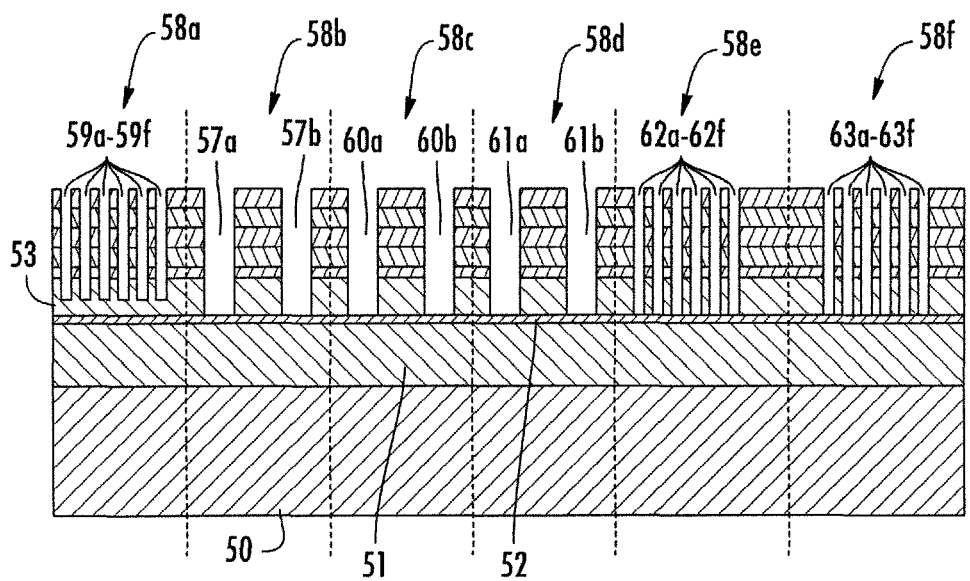

Referring now to FIGS. 8-9, the method illustratively includes forming a second photoresist layer 64 over the first EO device 58a (i.e. the mirrors for the laser cavity are shielded). The method illustratively includes performing at least one second etching, aligned with at least some 57a-57b, 60a-60b, 61a-61b, 62a-62f, 63a-63f of the initial alignment trenches 59a-59f, 57a-57b, 60a-60b, 61a-61b, 62a-62f, 63a-63f and using the first semiconductor layer 52 as an etch stop, to provide multi-level trenches of very well controlled depth. (Block 96) The method illustratively includes removing the second photoresist layer 64. Additionally, the performing of the at least one second etching illustratively includes a partial etching of the second semiconductor layer 53 (FIGS. 7-8), and a subsequent complete selective etching of the second semiconductor layer (FIG. 9).

Figure 10:
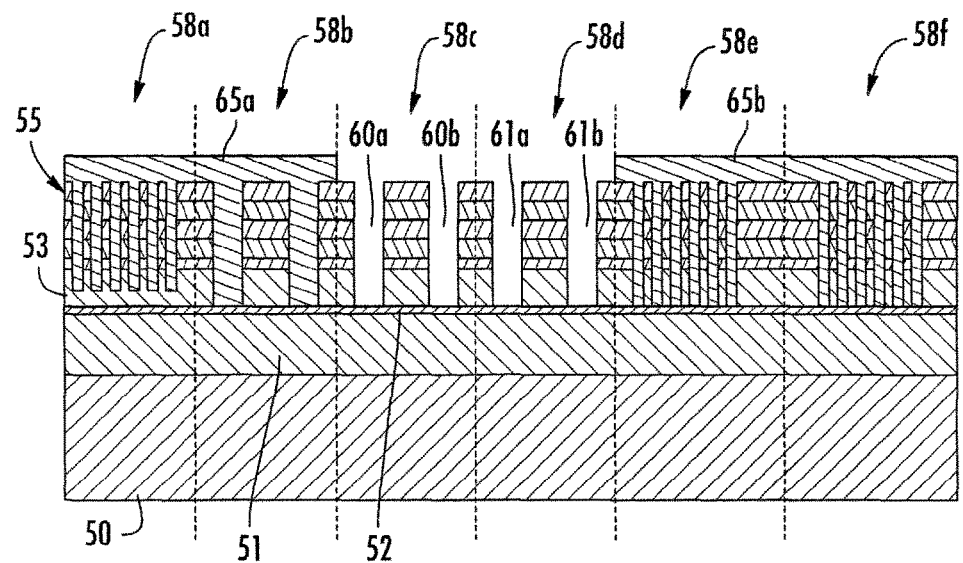
Figure 11:
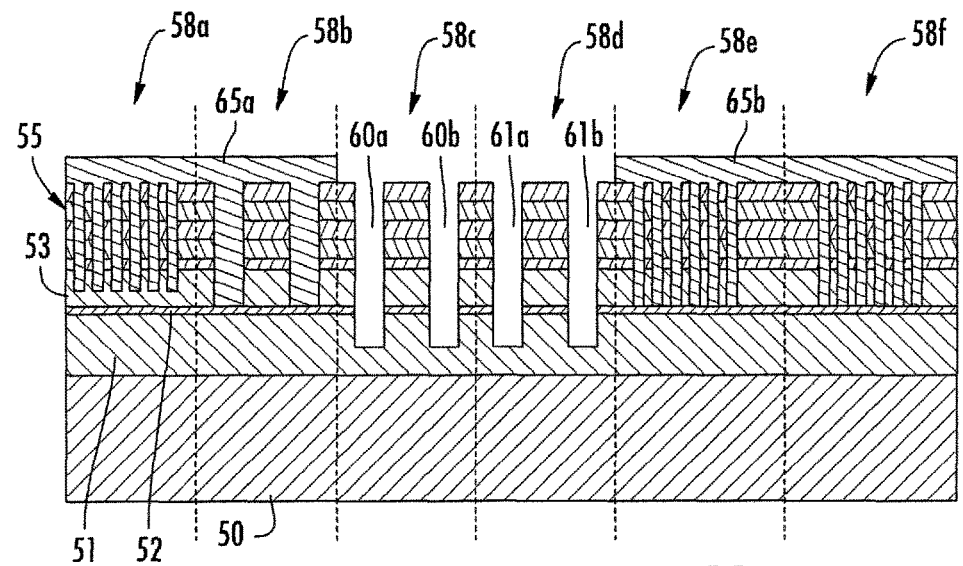

Referring now to FIGS. 10-11, the method illustratively includes forming a third photoresist layer 65a-65b over the first, second, fifth, and sixth EO devices 58a-58b, 58e-58f (i.e. shielding other devices for the formation of the waveguide ribs). The method illustratively includes a selective etching through the first semiconductor layer 52 followed by a partial etching through the semiconductor film 51. The method illustratively includes removing the third photoresist layer 65a-65b.

In other words, the method comprises performing at least one selective third etching of the first semiconductor layer 52 and the semiconductor film 51. The at least one selective third etching may comprise an etching of the first semiconductor layer 52 and a partial etching of the semiconductor film 51.

Figure 12:
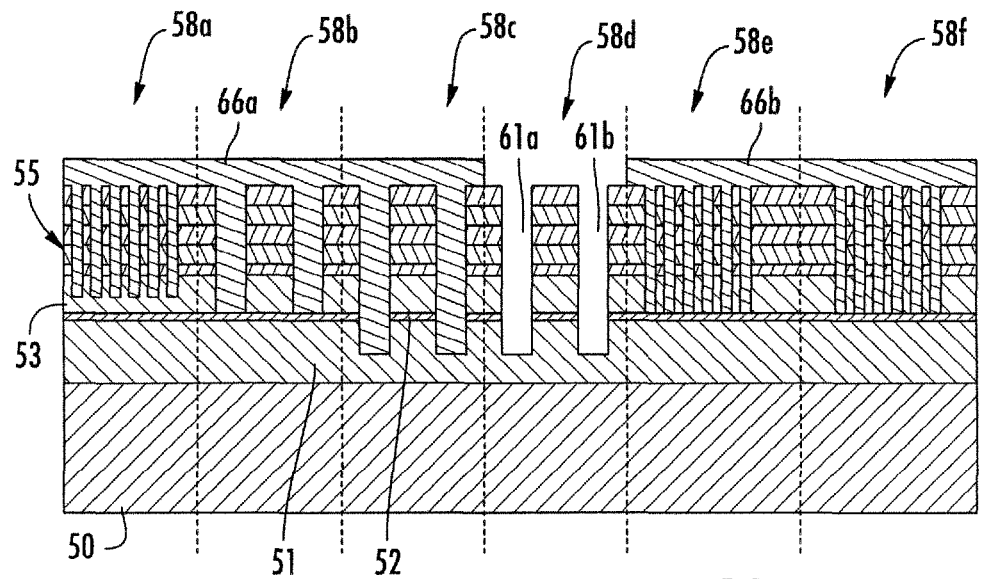
Figure 13:
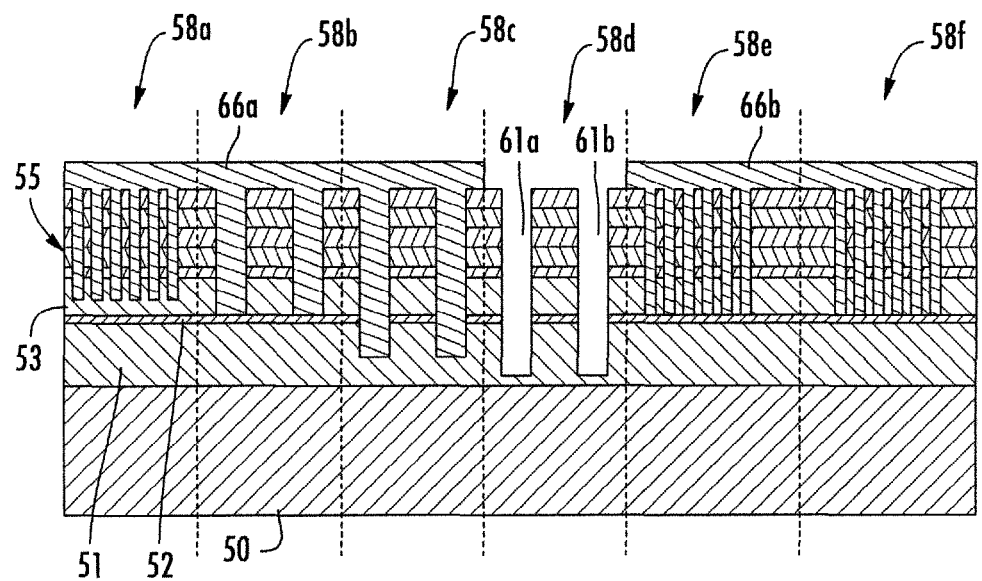

Referring now to FIGS. 12-13, the method illustratively includes forming a fourth photoresist layer 66a-66b over the first, second, third, fifth, and sixth EO devices 58a-58c, 58e-58f (i.e. shielding other devices for the formation of deeper waveguide ribs). The method illustratively includes a partial etching of the trenches 61a-61b in the semiconductor film 51 to leave only 50 nm of semiconductor material. The method illustratively includes removing the fourth photoresist layer 66a-66b.

As perhaps best seen in FIG. 13, the at least one third selective etching may comprise an etching of a first section (i.e. the third EO device 58c) of the semiconductor film 51 to a first depth, and an etching of a second section (i.e. the fourth EO device 58d) of the semiconductor film different than the first section and to a second depth different than the first depth (deeper depth in the illustrated embodiment).

Figure 14:
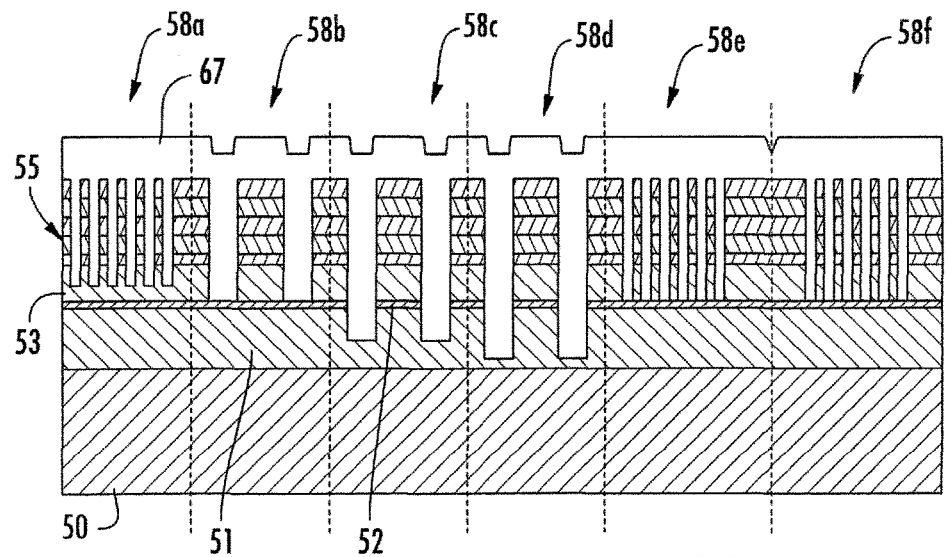
Figure 15:
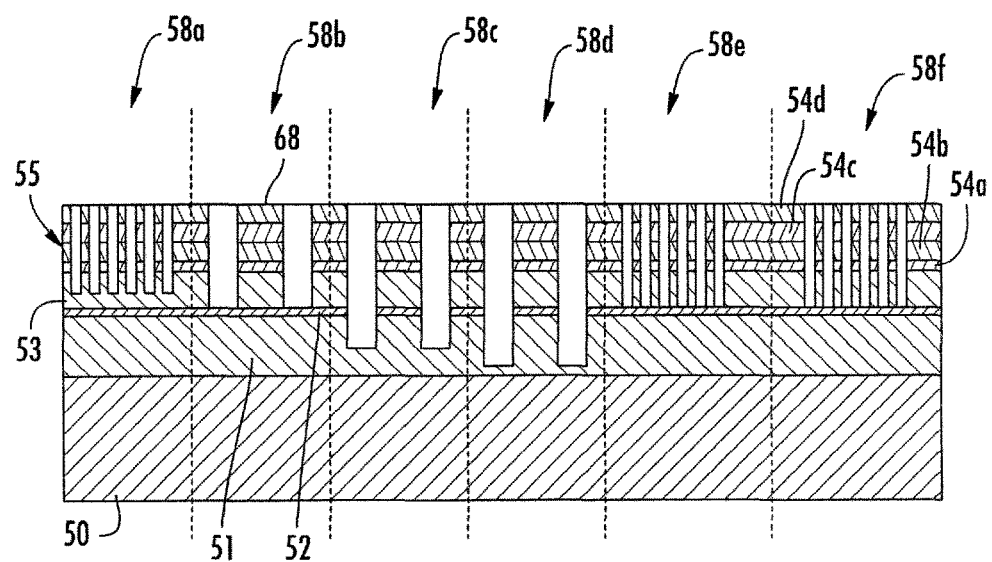

Referring now to FIGS. 14-15, the method illustratively includes filling the multi-level trenches with at least one dielectric material 67, by chemical vapor deposition (CVD) for example. (Block 97) For example, the dielectric material 67 may comprise silicon dioxide. The method illustratively includes at least one planarization step, for example, a chemical mechanical polishing (CMP), to define a planar surface 68. The top mask layer 54d (i.e. the silicon nitride mask layer) is used as a stop layer.

Figure 16:
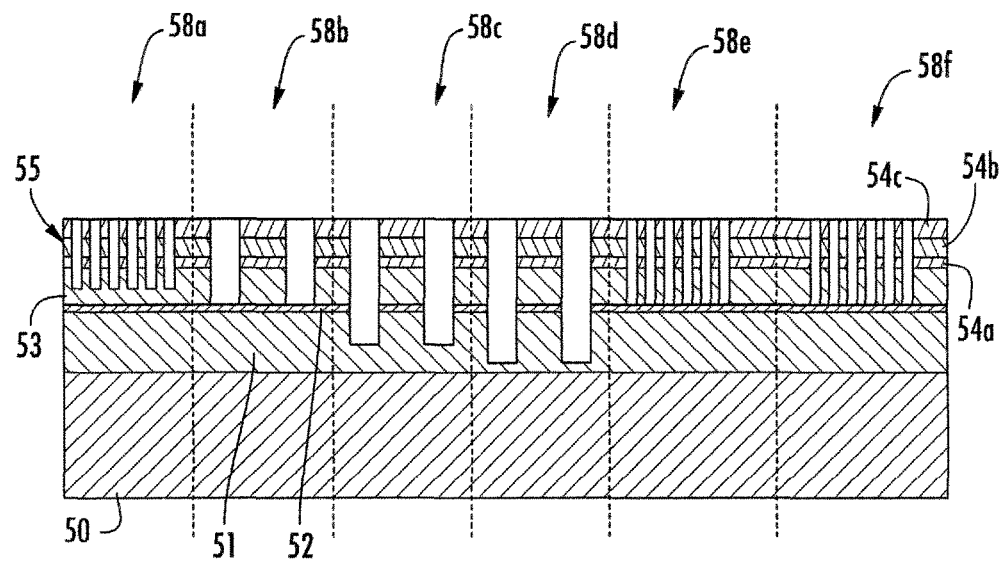
Figure 17:
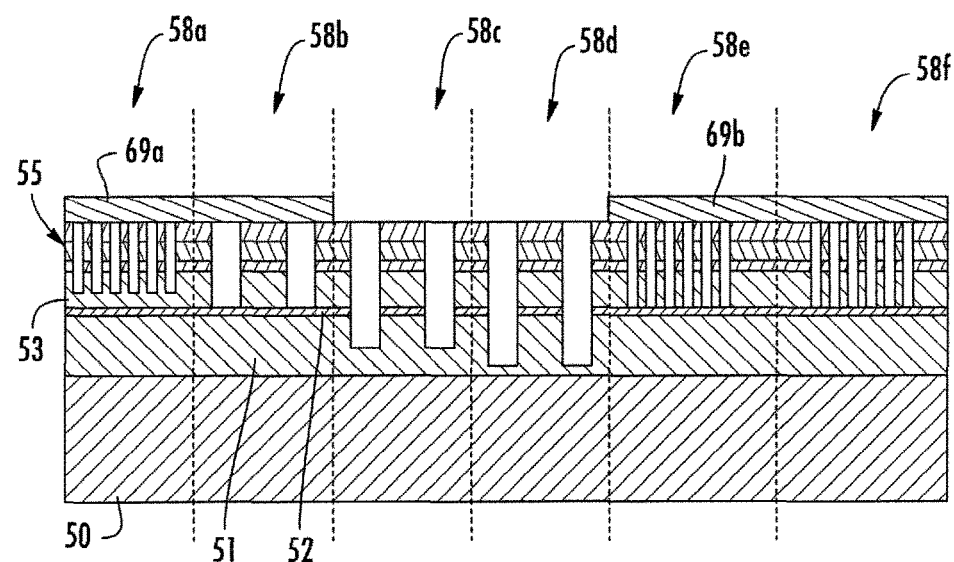

Referring now to FIGS. 16-17, the method illustratively includes an etching (e.g. an oxide/nitride etch) to remove the top mask layer 54d and the surrounding dielectric material 67. The method illustratively includes forming a fifth photoresist layer 69a-69b over the first, second, fifth, and sixth EO devices 58a-58b, 58e-58f (i.e. shielding other devices for the formation of the waveguide ribs).

Figure 18:
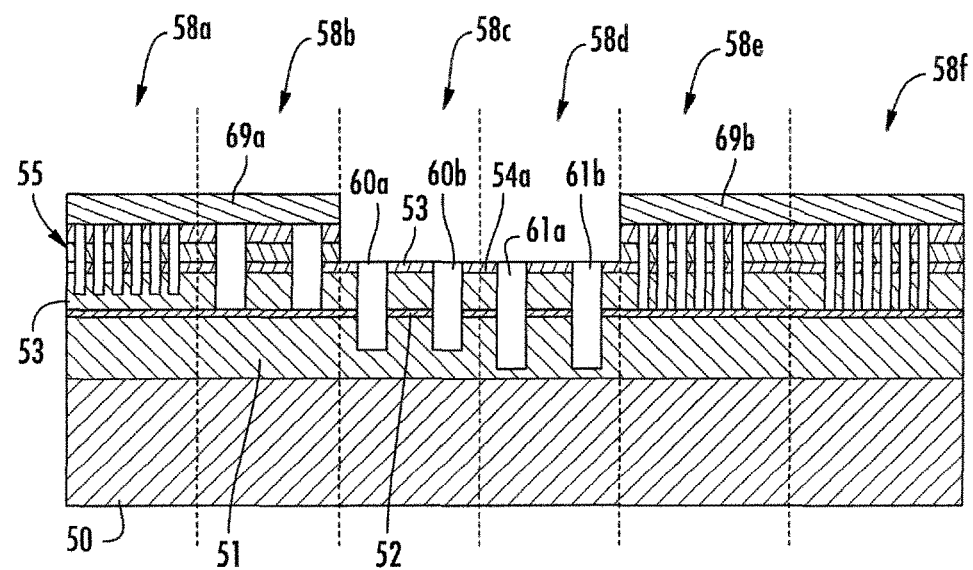
Figure 19:
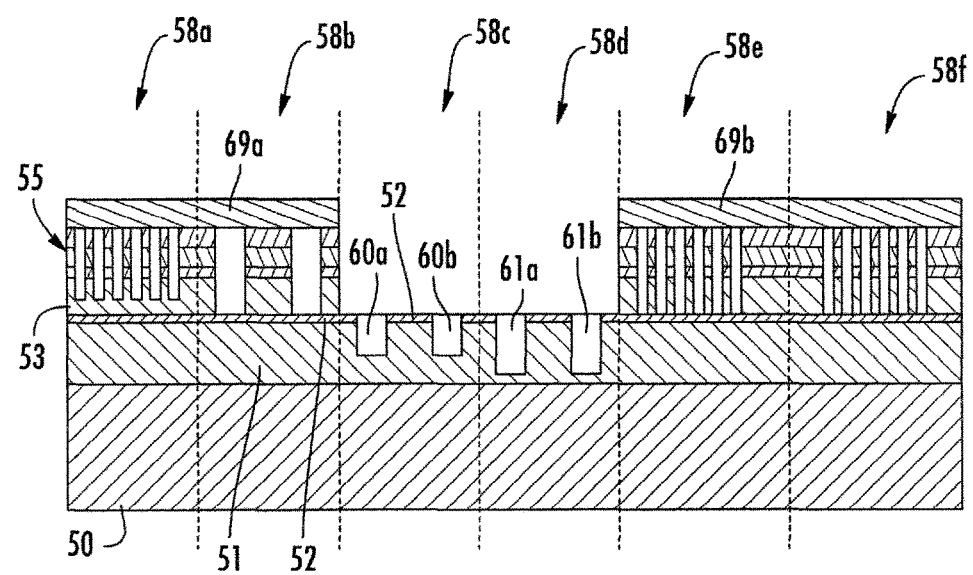

Referring now to FIGS. 18-19, the method illustratively includes a selective etching of the silicon dioxide mask layer 54c, and another etching (e.g. an isotropic oxide/nitride etch) to remove the silicon nitride mask layer 54b. The method illustratively includes an etching of the last silicon dioxide mask layer 54a and the second semiconductor layer 53, the first semiconductor layer 52 serving as the stop layer.

Figure 20:
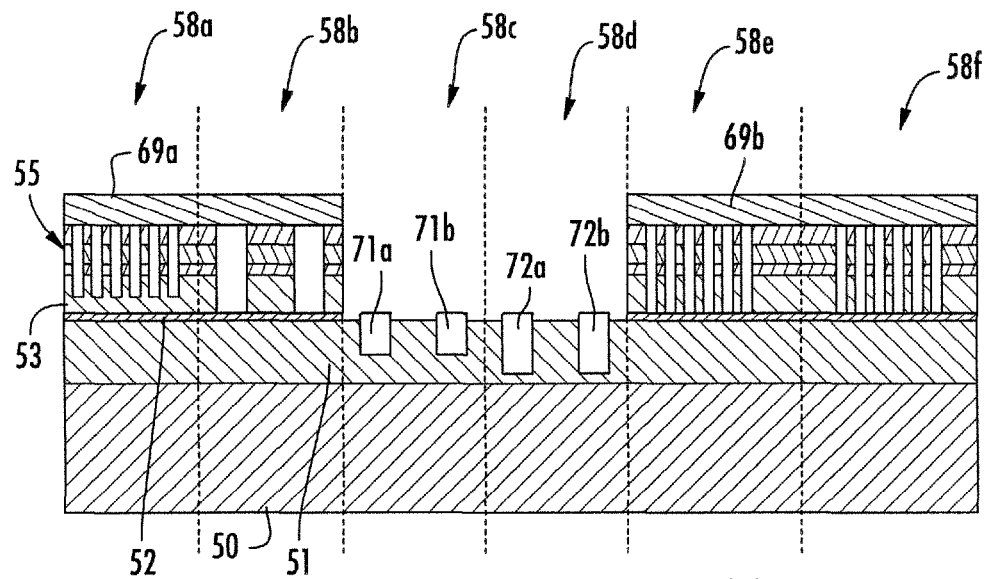
Figure 21:
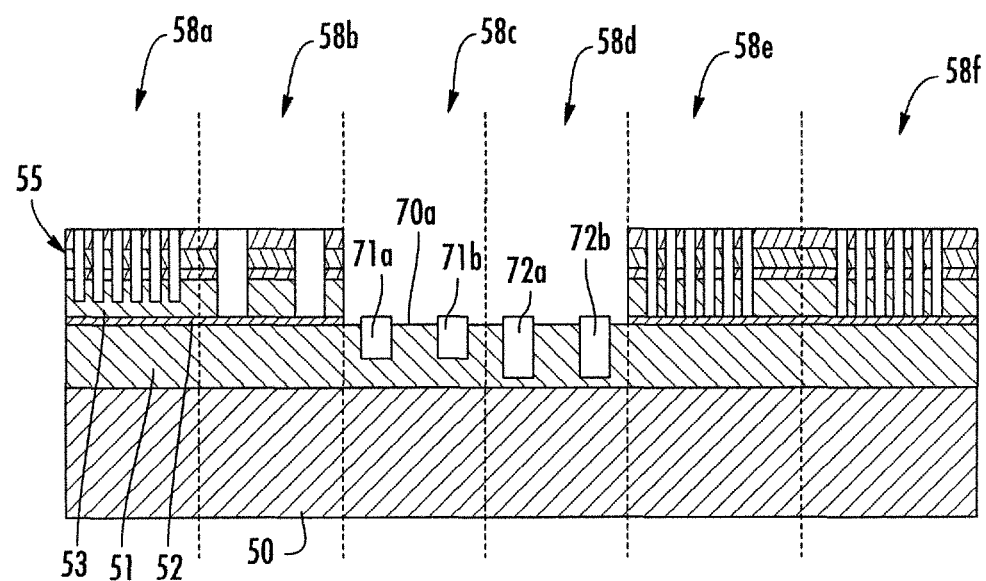

Referring now to FIGS. 20-21, the method illustratively includes an etching of first semiconductor layer 52, defining ribs of semiconductor surrounding the filled plurality of second trenches 71a-71b, 72a-72b (i.e. strips) of dielectric material. The method illustratively includes removing the fifth photoresist layer 69a-69b, and forming a dielectric liner layer 70 over the third and fourth EO devices 58c-58d via a thermal oxidation process, for example. In other words, the method includes filling the multi-level trenches 60a-60b, 61a-61b with the dielectric material 67 (during the step of FIG. 14) to make the third and fourth EO devices 58c-58d having multiple thicknesses. (Block 97)

Figure 22:
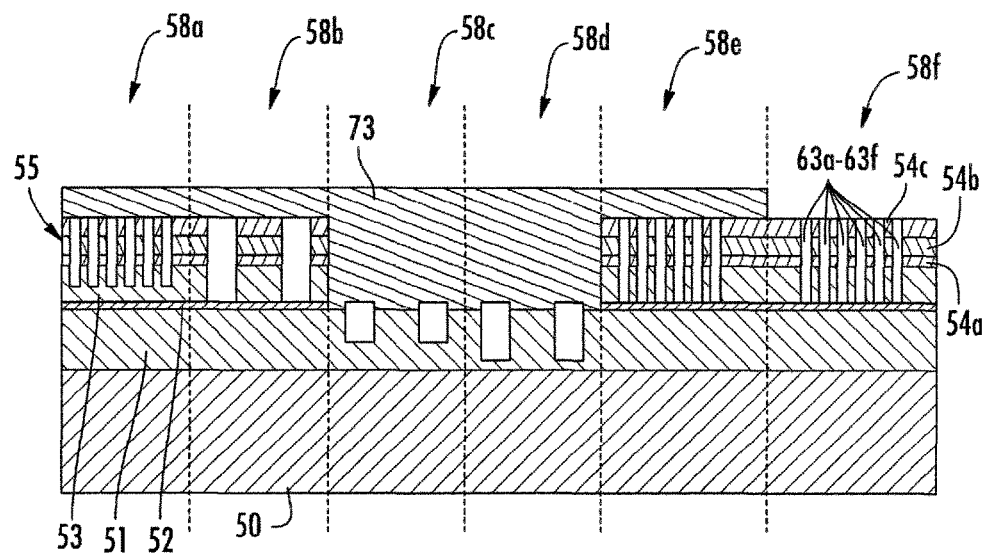
Figure 23:
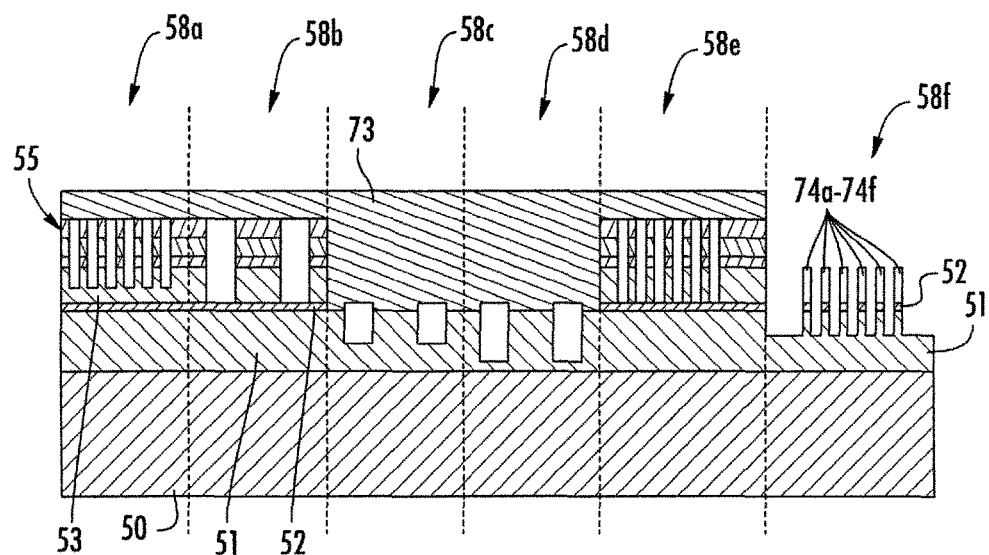

Referring now to FIGS. 22-23, the method illustratively includes forming a sixth photoresist layer 73 over the first, second, third, fourth, and fifth EO devices 58a-58e. The method illustratively includes successive etchings of the mask layers 54a-54c, and a subsequent selective semiconductor etching into the semiconductor film 51, defining ribs 74a-74f each comprising portions of the semiconductor film 51, the first semiconductor layer 52, and the dielectric material 67. The pattern in semiconductor is the inverse of the photolithography pattern from FIG. 4. This scheme allows targeting smaller trenches without changing the lithography. Indeed, remaining portions of the dielectric material 67 forming the upper portions of the ribs 74a-74f serve as a hard mask pattern for subsequent etching of ribs 74a-74f in the first semiconductor layer 52 and the semiconductor film 51, By simple trimming of this hardmask, i.e. the reduction of the lateral width of the pattern by method known in the art, more aggressive Critical Dimensions can be obtained for the ribs 74a-74f (i.e. smaller features can be achieved.), compared with the standard method consisting in the patterning of trenches in the semiconductor film through a hardmask defined by a direct photolithography process step, followed by the filling of the trenches with oxide. Achieving smaller features allows Poring improved grating couplers, exhibiting lower parasitic reflexion thanks to design techniques like apodization.

Figure 24:
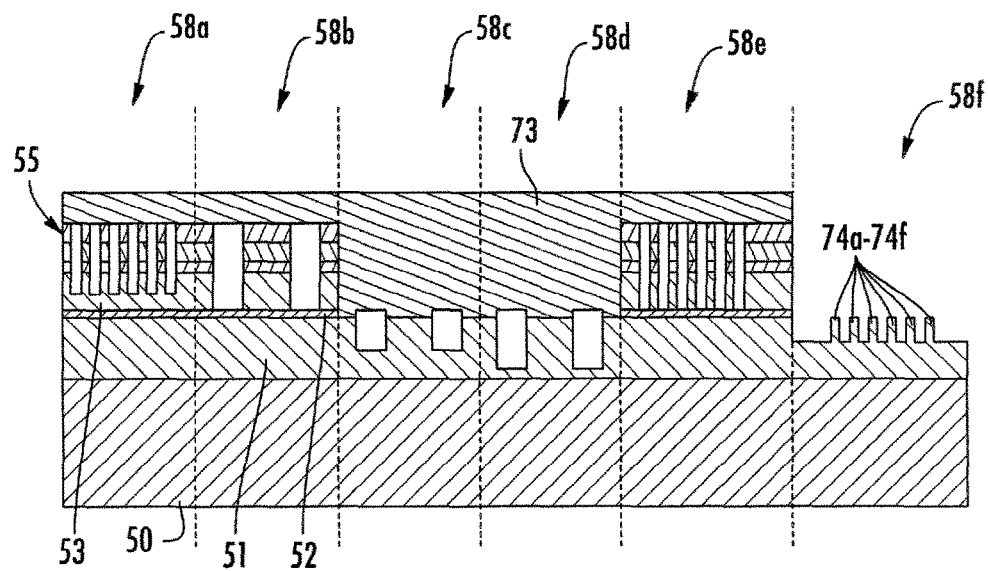
Figure 25:
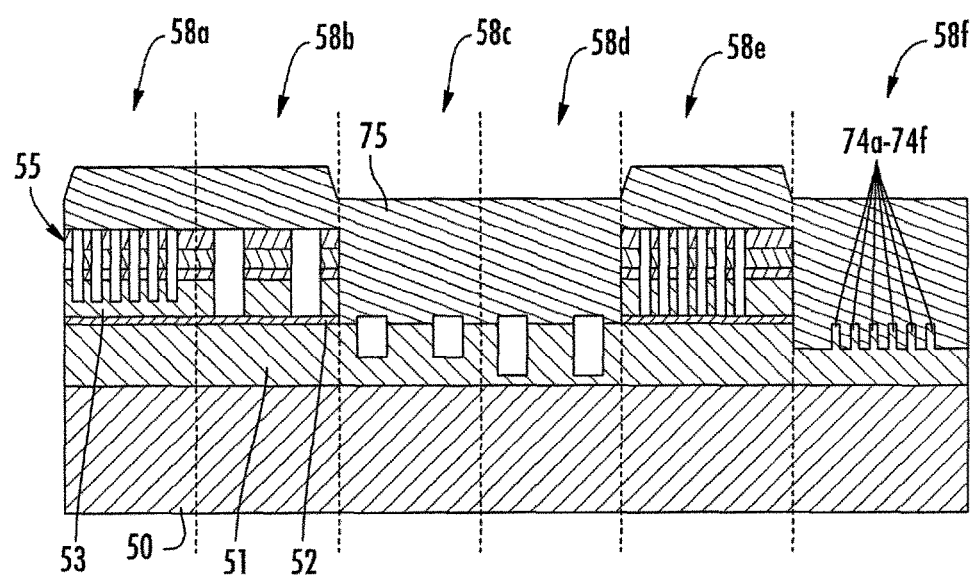

Referring now to FIGS. 24-25, the method illustratively includes an etching of the first semiconductor layer 52 and dielectric material 67 portions of the ribs 74a-74f. The method illustratively includes removing the sixth photoresist layer 73. The method illustratively includes forming a dielectric liner layer over the sixth EO device 58f via a thermal oxidation process, for example. The method illustratively includes forming a dielectric layer 75 over the photonic chip 80, by chemical vapor deposition (CVD) for example.

Figure 26:
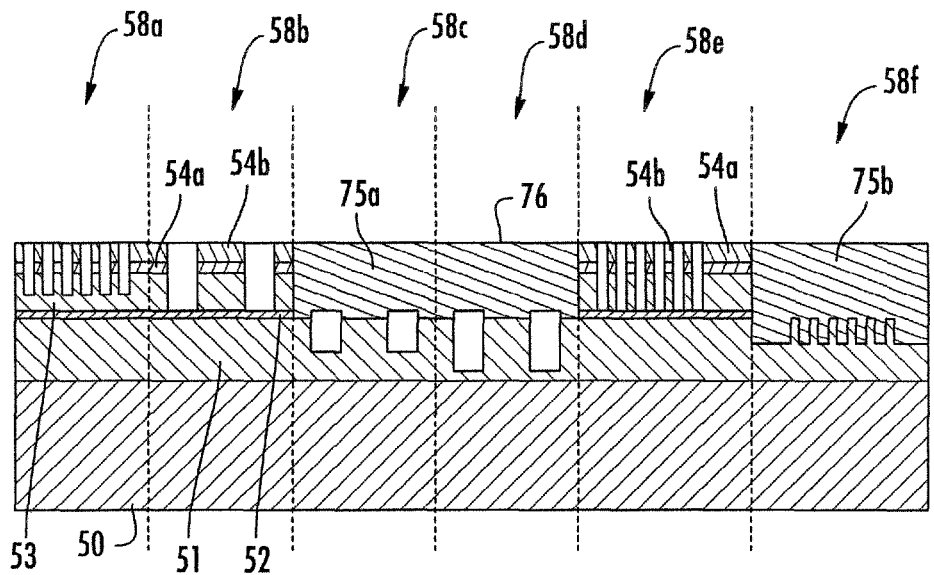

Referring now to FIGS. 26-27, the method illustratively includes at least one planarization step, for example, a CMP, to define a planar surface 76. The top mask layer 54b (i.e. the silicon nitride mask layer) is used as a stop layer. In some embodiments, the method includes an inverse oxide etch layer before the at least one planarization step. The method illustratively includes an etching of the remaining mask layer 54b.

In other words, the method includes doing a selective partial silicon dioxide etching, which is a wet process done with fixed time and without an etch stop layer. The target is to reach the foot of the silicon nitride layer 54b. The second step includes doing a total silicon nitride etching to achieve the planar surface 76. The combination of those two steps is commonly called: ON etch in the complementary metal-oxide-semiconductor (CMOS) industry. The same principle is used in different steps in the present disclosure, after the CMPs, for example.

As can be seen best perhaps in FIG. 27, the method includes filling the multi-level trenches 59a-59f, 57a-57b, 62a-62f with the dielectric material 67, 75 (FIGS. 14 and 25) to make the first, second, and fifth EO devices 58a-58b, 58e having multiple thicknesses. (Blocks 97-98) Also, the method includes forming an encapsulation layer with the dielectric material 67, 75 over the semiconductor film 51 to make the third, fourth, and sixth EO devices 58d, 58f.

The fifth and sixth EO devices 58e-58f comprise grating couplers that may be used for single polarization grating coupler applications for transferring an optical signal between the photonic chip 80 and an external optical fiber. In these applications, the trenches in the couplers are manufactured to a fine resolution to avoid back reflections. Nevertheless, the disclosed method provides for a manufacturing resolution that permits the integration of these devices via the inverse patterning feature.

Many typical methods for making photonic chips provide simple silicon photonic systems that are made up of only a few devices. A single partial silicon etch is typically used. The partial etch is a compromise, which is evaluated based on individual device performance. When ramping up to large system integration, more devices may be integrated and the compromise does not work out for those applications.

For example, the typical methods may integrate laser sources on a photonic chip with one of: successive partial silicon etching without control on uniformity, backside integration, and amorphous silicon deposition to obtain locally 500 nm of silicon. The typical methods may suffer from drawbacks. In the successive partial silicon etching methods, the measured thickness range in partially etched silicon is high. Consequently, the fabrication process reproducibility is low and the device variability is very high (i.e. producing a low yield). With backside integration methods, the process is devoted to laser integration, and it does not include advanced silicon patterning for silicon device introduction and/or optimization. With amorphous silicon deposition methods, the deposited amorphous silicon is relevant only for laser integration. Also, amorphous silicon imposes a thermal budget of 400° C., which is incompatible with a complete silicon photonics flow which also includes active devices (i.e. implantation, germanium epitaxy etc.). The present disclosure provides an approach to these drawbacks of typical methods by integrating more complex devices and providing improved performance.

Advantageously, the disclosed method may: provide a silicon patterning process capable of integrating various partial etch levels, minimize partial etch variability, integrate standard RIB and deep RIB waveguides, dissociate grating coupler etching from macro structures, integrate structures, such as a laser with at least 500 nm silicon, integrate grating couplers with at least 500 nm silicon, and provide a silicon thickness adapted to and optimized for each of the plurality of EO devices 58a-58f.

The disclosed method uses the first semiconductor layer 52 of silicon germanium as an etch stop layer to differentiate between 300 nm SOI and 500 nm SOI devices. Also, the disclosed method uses inverse patterning to fabricate critical devices. The disclosed method uses selective etch strategies with respect to silicon, silicon dioxide, silicon nitride, and photoresist are used to pattern silicon locally, and a single step hard mask patterning to auto-align circuit system.

Advantageously, the disclosed method may enable the fabrication of silicon photonic patterning with 6 (illustrative example) or more different silicon thicknesses, with a good thickness control. It is a feature that allows designers to make much more flexible devices as compared to the typical methods (usually 2 different thicknesses). Moreover, the disclosed method makes laser integration feasible, and may provide more aggressive critical distances (e.g. trenches <60 nm).

Other features relating to photonic chips are disclosed in co-pending applications titled "PHOTONIC INTEGRATED CIRCUIT AND FABRICATION PROCESS," U.S. application Ser. No. 14/311,496, which is incorporated herein by reference in its entirety.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. A method for making a photonic chip including a plurality of electro-optic (EO) devices having multiple thicknesses, the method comprising:
   forming a first semiconductor layer over a semiconductor film;
   forming a second semiconductor layer over the first semiconductor layer;
   forming at least one mask layer over the second semiconductor layer;
   performing a first selective etching of the at least one mask layer to provide initial alignment trenches;
   performing at least one second etching, aligned with at least some of the initial alignment trenches and using the first semiconductor layer as an etch stop, to provide multi-level trenches; and
   filling the multi-level trenches to make the plurality of EO devices having multiple thicknesses.

2. The method of claim 1 wherein the performing of the at least one second etching comprises a partial etching of the second semiconductor layer, and a subsequent complete selective etching of the second semiconductor layer.

3. The method of claim 1 further comprising performing at least one selective third etching of the first semiconductor layer and the semiconductor film.

4. The method of claim 3 wherein the at least one selective third etching comprises a partial etching of the first semiconductor layer and the semiconductor film.

5. The method of claim 3 wherein the at least one third selective etching comprises an etching of a first section of the semiconductor film to a first depth, and an etching of a second section of the semiconductor film different than the first section and to a second depth different than the first depth.

6. The method of claim 1 wherein the first semiconductor layer comprises silicon germanium; and wherein the second semiconductor layer comprises silicon.

7. The method of claim 1 wherein the first selective etching is to a uniform depth.

8. The method of claim 1 further comprising at least one planarization step.

9. The method of claim 1 wherein the filling of the multi-level trenches comprises filling the multi-level trenches with at least one dielectric material.

10. The method of claim 1 wherein the plurality of EO devices having multiple thicknesses comprises an optical waveguide and an optical grating coupler.

11. A method for making a photonic chip including a plurality of electro-optic (EO) devices having multiple thicknesses, the method comprising:
   forming a first semiconductor layer over a semiconductor film;
   forming a second semiconductor layer over the first semiconductor layer;
   forming at least one mask layer over the second semiconductor layer;
   performing a first selective etching of the at least one mask layer to provide initial alignment trenches;
   performing at least one second etching, aligned with at least some of the initial alignment trenches and using the first semiconductor layer as an etch stop, to provide multi-level trenches;
   performing at least one selective third etching of the first semiconductor layer and the semiconductor film; and
   filling the multi-level trenches to make the plurality of EO devices having multiple thicknesses, the plurality of EO devices having multiple thicknesses comprising an optical waveguide and an optical grating coupler.

12. The method of claim 11 wherein the performing of the at least one second etching comprises a partial etching of the second semiconductor layer, and a subsequent complete selective etching of the second semiconductor layer.

13. The method of claim 11 wherein the at least one selective third etching comprises a partial etching of the first semiconductor layer and the semiconductor film.

14. The method of claim 11 wherein the at least one third selective etching comprises an etching of a first section of the semiconductor film to a first depth, and an etching of a second section of the semiconductor film different than the first section and to a second depth different than the first depth.

15. The method of claim 11 wherein the first semiconductor layer comprises silicon germanium; and wherein the second semiconductor layer comprises silicon.

16. The method of claim 11 wherein the first selective etching is to a uniform depth.

17. A photonic chip comprising:
   a semiconductor film;
   a first semiconductor layer above said semiconductor film;
   a second semiconductor layer above said first semiconductor layer and having at least one first trench extending within said second semiconductor layer partially toward said first semiconductor layer before reaching a bottom surface of said second semiconductor layer and at least one second trench extending through said second semiconductor layer and reaching said first semiconductor layer; and
   dielectric material within the at least one first trench and within the at least one second trench to define first and second respective electro-optic (EO) devices having multiple thicknesses.

18. The photonic chip of claim 17 wherein said first semiconductor layer comprises silicon germanium; and wherein said second semiconductor layer comprises silicon.

19. The photonic chip of claim 17 wherein said first and second semiconductor layers define at least one third trench extending through to said semiconductor film.

20. The photonic chip of claim 17 wherein said first and second respective EO devices are at a same level.

21. The photonic chip of claim 17 wherein said first respective EO device comprises an optical waveguide; and wherein said second respective EO device comprises an optical grating coupler.

* * * * *